United States Patent

Aguirre et al.

[11] Patent Number: 5,865,148
[45] Date of Patent: Feb. 2, 1999

[54] DECORATIVE, INTERCHANGEABLE DOG COLLAR

[76] Inventors: Francisco X. Aguirre, 1101 Brent Ave., South Pasadena, Calif. 91030; Kent M. Mustari, 11661 Sunshine Ter., Studio City, Calif. 91604

[21] Appl. No.: 580,624

[22] Filed: Dec. 29, 1995

[51] Int. Cl.[6] ................................................. A01K 27/00
[52] U.S. Cl. ........................... 119/856; 119/863; D30/152
[58] Field of Search ..................... 119/856, 858, 119/863; D30/151, 152; 54/24

[56] References Cited

U.S. PATENT DOCUMENTS

| D. 21,344 | 2/1892 | Bryant | D30/152 |
|---|---|---|---|
| D. 337,394 | 7/1993 | Steiner | D30/152 |
| D. 377,245 | 1/1997 | Norman et al. | D30/152 |
| 2,898,602 | 8/1959 | Moss | 119/858 |
| 3,765,376 | 10/1973 | Higgins | 119/858 |
| 4,141,322 | 2/1979 | Evans et al. | 119/856 |
| 4,218,991 | 8/1980 | Cole | 119/858 |
| 4,266,511 | 5/1981 | Muench | 119/858 |
| 4,309,797 | 1/1982 | Schrougham et al. | 119/863 X |
| 4,407,233 | 10/1983 | Bozzacco | 119/858 X |
| 4,993,215 | 2/1991 | Schutte | 119/856 X |
| 5,363,809 | 11/1994 | Roe | 119/858 |
| 5,615,539 | 4/1997 | Graham | 54/24 |

FOREIGN PATENT DOCUMENTS 458518 12/1936 United Kingdom ................... 119/858

*Primary Examiner*—Robert P. Swiatek
*Assistant Examiner*—Elizabeth Shaw
*Attorney, Agent, or Firm*—Sheldon & Mak

[57] ABSTRACT

A kit for forming multiple decorative dog collars has two flexible collar end sections and at least two different, decorative, flexible collar intermediate sections. Any one of the intermediate sections can be connected to the end sections to form a decorative collar. The end sections have fasteners for connecting them together for looping around the neck of a dog.

13 Claims, 1 Drawing Sheet

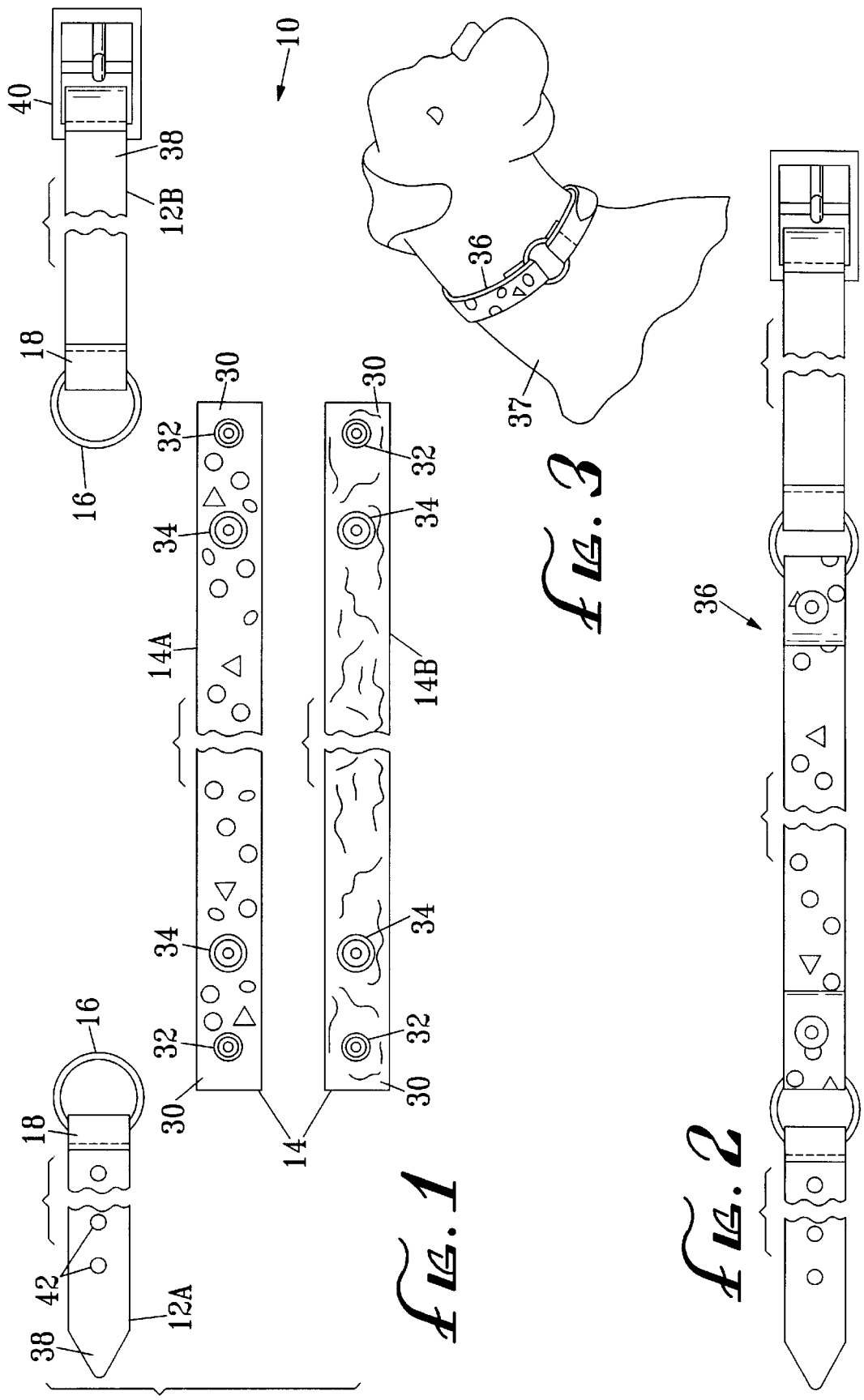

DECORATIVE, INTERCHANGEABLE DOG COLLAR

BACKGROUND

The present invention is directed to a decorative dog collar.

Many owners of dogs desire to have decorative collars for their dogs. However, the ornamentation rapidly soils and deteriorates, losing attractiveness, even though the dog collar remains functionally satisfactory. Another problem with many decorative dog collars is that it is necessary to purchase a complete new dog collar when the color or design becomes aesthetically unattractive or out of style, or when the owner of the dog desires to change to a collar of a different aesthetic appearance.

Accordingly, there is a need for a ornamental, decorative dog collar which need not be discarded merely because it is soiled, and need not be replaced merely because the owner desires to have a color with a different appearance.

SUMMARY

The present invention is directed to a dog collar that satisfies this need, and a kit for forming the dog collar. In particular, the present invention provides a kit for forming multiple decorative and ornamental dog collars. The kit comprises two flexible collar end sections and at least two different, decorative, flexible collar intermediate sections. Connectors are provided for interchangeably and removably connecting a selected one of the intermediate sections to each of the end sections to form a collar. The formed collar can then be formed into a single loop for placement around the neck of the dog, utilizing fastening means on the end sections for removably fastening the end sections together. The selected intermediate section is removable from the end section so that the decorative appearance of the collar can be changed merely be selecting another one of the intermediate sections.

Thus, according to the present invention, merely by changing out one of the intermediate sections, it is possible to have a new attractive and ornamental dog collar, without having to replace the end sections.

DRAWINGS

These and other features, aspects, and advantages of the present invention will become better understood with reference to the following description, dependent claims, and accompanying drawings, where:

FIG. 1 is a perspective view of a kit according to the present invention for forming dog collars with interchangeable, intermediate sections;

FIG. 2 is a perspective view of a dog collar according to the present invention formed from the kit of FIG. 1; and FIG. 3 shows the dog collar of FIG. 2 on a dog.

DESCRIPTION

With reference to the figures, a kit 10 for forming multiple decorative dog collars according to the present invention comprises two flexible collar end sections 12a and 12b, and multiple different, decorative, flexible collar intermediate sections 14a and 14b.

Connecting means are provided for interchangeably and removably connecting the intermediate sections 14 to each of the end sections 12. Preferably, the connecting means comprises rings 16 secured to the end sections 12 by overlapping first ends 18 of the end sections 12 and stitching the ends 18 together to hold the ring 16.

Either one of the intermediate sections 14 can be selected for connection to the rings 16. This is effected by folding over the opposed ends 30 of the intermediate section 14 over the rings. Each of the ends 30 of each of the intermediate sections 14 is provided with an interengaging male 32/female 34 snap fastener, which are engaged, for removably securing the intermediate section 14 to the rings 16. Thus assembled, the selected intermediate section 14 and two end sections 12 form a continuous flexible dog collar 36, suitable for placement around the neck of a dog 37.

The rings 16 can serve for attachment of a leash.

The collar is secured to the dog 37 by fastening means on second ends 38 of the end sections 12. The fastening means comprises a buckle 40 secured to one of the end sections 12a and a plurality of holes 42 in the second end 38 of the other end section 12b. As shown in FIG. 3, the collar of FIG. 2, when thus assembled, provides a decorative collar for the dog 37. Moreover, merely by unsnapping the male/female fasteners of the intermediate section 14a, the intermediate section 14a can be replaced with the intermediate section 14b to provide a different ornamental collar.

The end sections 12 and intermediate sections 14 can be made of the same material or a different material. They can made of woven material such as plastic (e.g., nylon, polypropylene, or the like) or fabric. Typically the end sections 12 are made of leather 12 and the intermediate section 14 is made of fabric.

When rings 16 are used, preferably they are circular, but other shapes can be used, such as square, triangular, or rectangular. When rings 16 are used, the first ends 18 of the end sections 12 can be secured to the rings 16, by means other than stitching, such as rivets, screws, releasable male-female fasteners, and other known means for use with collars, such as adhesives.

The connecting means does not necessarily need to comprise a ring system. Rather, the intermediate section 14 can be connected to the end sections 12 directly by snap fasteners and other releasable connectors such as hook and fabric fasteners sold under the trademark Velcro. This is a less preferred version since it does not provide as secure a collar.

When the ring system is used, the intermediate sections 14 can be connected to the ring 16 by other releasable fasteners, such as hook and fabric fasteners sold under the trademark Velcro, and easily releasable screw or bolt assembles.

The fastening means need not necessarily be the buckle/hole system 42, but can use any technique conventional in dog collars, such as hook and fabric fasteners.

The intermediate sections 14 can have any ornamental design desired. For example, they can be solid colored, plaid, striped, or other checkered patterns. They can be provided with such features as the name of the animal, or the breed of the animal. They can be custom made to provide a custom design for a particular owner.

While the present invention is described in considerable detail with reference to certain preferred versions thereof, other versions are possible. For example, the kit can be provided with intermediate sections of different lengths accommodating dogs of different sizes. Moreover, a kit can be provided with multiple intermediate sections that can be jointed together, such as with snap fasteners, to provide different decorative effects in different lengths, so that a dog collar can be made of four or more sections, two end sections and two or more intermediate sections. Further, additional rings can be provided for attachment of a leash. Therefore, the spirit scope of the appended claims should not be limited to the description of the preferred versions contained herein.

What is claimed is:

1. A kit for forming multiple decorative dog collars comprising:
   a) two flexible collar end sections;
   b) at least two different, decorative, flexible, collar intermediate sections, each intermediate section having opposed ends;
   c) connecting means for interchangeably and removably connecting a selected one of the intermediate sections to each of the end sections to form a collar, the selected intermediate section being removable from the end sections so that the decorative appearance of the collar can be changed by selecting another one of the intermediate sections; and
   d) fastening means on the end sections for removably fastening the end sections together to provide a single loop about the neck of a dog.

2. The kit of claim 1 wherein the connecting means comprises two rings, each substantially permanently attached to a respective one of the end sections, and attaching means for removably attaching the selected intermediate section to the rings.

3. The kit of claim 2 wherein the attaching means comprises male/female snap fasteners at each end of the intermediate sections so each end can be folded over a respective one of the rings and the fasteners snapped together.

4. The kit of claim 1 wherein the intermediate sections are of different lengths.

5. The kit of claim 1 including means for attaching the intermediate sections together.

6. The kit of claim 1 wherein the connecting means comprises repeatedly releasable connectors.

7. A kit for forming multiple decorative dog collars comprising:
   a) two flexible collar end sections;
   b) at least two different, decorative, flexible, collar intermediate sections, each intermediate section having opposed ends;
   c) a connector for connecting a selected one of the intermediate sections to each of the end sections to form a collar, the selected intermediate section being removable from the end sections so that the decorative appearance of the collar can be changed by selecting another one of the intermediate sections; and
   d) a fastener for removably fastening the end sections together to provide a single loop about the neck of a dog.

8. The kit of claim 7 wherein each connector comprises a ring, each ring being substantially permanently attached to a respective one of the end sections.

9. The collar of claim 7, wherein the connector comprises two rings, each substantially permanently attached to a respective one of the end sections, and attaching means for removably attaching the selected intermediate section to the rings.

10. The kit of claim 9 wherein the attaching means comprises male/female snap fasteners at each end of the intermediate sections so each end can be folded over a respective one of the rings and the fasteners snapped together.

11. The kit of claim 7 wherein the connector comprises repeatedly releasable connectors.

12. A method for changing the appearance of a dog collar comprising the steps of:
   (a) selecting a dog collar comprising:
      (i) two flexible collar end sections;
      (ii) a decorative collar intermediate section;
      (iii) repeatedly releasable connectors removably connecting the intermediate section to each of the end sections to form a collar, the intermediate section being removable from the end sections by releasing the connectors so that the decorative appearance of the collar can be changed by replacing the intermediate section with another intermediate section and connecting the releasable connectors; and
      (iv) fastening means for removably fastening the end sections together to provide a single loop about the neck of a dog;
   (b) removing the intermediate section from the dog collar by releasing the connectors connecting the intermediate section to each of the end sections; and
   (c) placing a new decorative intermediate section in the collar and refastening the releasable connectors to the new intermediate section.

13. A method for changing a dog collar comprising the steps of:
   (a) selecting a dog collar comprising:
      i) two flexible collar end sections;
      ii) an intermediate section;
      iii) repeatedly releasable connectors removably connecting the intermediate section to each of the end sections to form a collar, the intermediate section being removable from the end sections by releasing the connectors so that the appearance of the collar can be changed by replacing the intermediate section with another intermediate section and refastening the releasable connectors; and
      iv) fastening means for removably fastening the end sections together to provide a single loop about the neck of a dog;
   (b) removing the intermediate section from the dog collar by releasing the connectors connecting the intermediate section to each of the end sections; and
   (c) placing a new intermediate section in the collar and connecting the releasable connectors to the new intermediate section.

* * * * *